(12) United States Patent
Shen et al.

(10) Patent No.: US 11,520,657 B1
(45) Date of Patent: Dec. 6, 2022

(54) DEFECT DETECTION IN MEMORY BASED ON ACTIVE MONITORING OF READ OPERATIONS

(71) Applicant: Micron Technology, Inc., Boise, ID (US)

(72) Inventors: Zhenlei Shen, Milpitas, CA (US); Tingjun Xie, Milpitas, CA (US); Frederick Adi, Castro Valley, CA (US); Wei Wang, Dublin, CA (US); Zhenming Zhou, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/445,392

(22) Filed: Aug. 18, 2021

(51) Int. Cl.
  *G06F 11/00* (2006.01)
  *G06F 11/10* (2006.01)
  *G06F 11/07* (2006.01)

(52) U.S. Cl.
  CPC ........ *G06F 11/1068* (2013.01); *G06F 11/076* (2013.01); *G06F 11/0757* (2013.01); *G06F 11/0772* (2013.01)

(58) Field of Classification Search
  None
  See application file for complete search history.

(56) References Cited

U.S. PATENT DOCUMENTS

| | | | |
|---|---|---|---|
| 10,553,290 B1* | 2/2020 | Muchherla | G11C 16/26 |
| 2012/0254676 A1* | 10/2012 | Hirairi | G06F 1/3296 |
| | | | 714/704 |
| 2014/0185579 A1* | 7/2014 | Popovski | H04L 65/1016 |
| | | | 370/329 |
| 2015/0006976 A1* | 1/2015 | Jeon | G11C 29/021 |
| | | | 714/54 |
| 2019/0306070 A1* | 10/2019 | Zheng | H04L 1/0007 |
| 2020/0133570 A1* | 4/2020 | Shadmi | G06F 3/0659 |
| 2020/0241984 A1* | 7/2020 | Shim | G06F 11/073 |
| 2020/0250029 A1* | 8/2020 | Worledge | G06F 11/1068 |
| 2020/0293228 A1* | 9/2020 | Amaki | G06F 11/1068 |

OTHER PUBLICATIONS

Z. Pan and M. A. Breuer, "Basing Acceptable Error-Tolerant Performance on Significance-Based Error-rate (SBER)," 26th IEEE VLSI Test Symposium (vts 2008), 2008, pp. 59-66, doi: 10.1109/VTS.2008.51. (Year: 2008).*

* cited by examiner

*Primary Examiner* — Daniel F. McMahon
(74) *Attorney, Agent, or Firm* — Lowenstein Sandler LLP (57) ABSTRACT

A first error rate based on a first read operation performed on a memory device is obtained. An individual data unit of the memory device that satisfies a first threshold criterion associated with a defect candidate is determined. A defect verification operation on the individual data unit to obtain a second error rate is performed. The individual data unit that satisfies a second threshold criterion associated with a defect is determined.

20 Claims, 6 Drawing Sheets

DEFECT DETECTION IN MEMORY BASED ON ACTIVE MONITORING OF READ OPERATIONS

TECHNICAL FIELD

Embodiments of the disclosure relate generally to memory sub-systems, and more specifically, relate to defect detection in memory based on active monitoring of read operations.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to defect detection in memory based on active monitoring of read operations. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. Memory devices at a memory sub-system can have particular properties that provide challenges in the operation of the memory sub-system. Some memory devices, such as non-volatile memory devices, can have limited endurance. For example, some memory devices can be written, read, or erased a finite number of times before the memory devices begin to physically degrade or wear and eventually fail.

Conventional memory sub-systems detect if a read fail has occurred on a data unit of a memory device. A data unit refers to a particular amount of memory, such as a page or block, of a memory device. In some embodiments, once a read fail is detected, the memory sub-system declares that the data unit is defective. In some instances, read failures occur due to intrinsic and/or extrinsic factors. Extrinsic factors refers to factors, which cause transient failures during read operations, such as time, temperature, read disturbs, and/or write disturbs. Intrinsic factors refer to the physical degrading or wearing of the data unit from read and write operations performed on the data unit. Conventional memory sub-systems typically declare data units defective only after the data unit has suffered a read fail, which already resulted in data loss. Once the conventional memory sub-systems mark the data units as defective, the memory sub-systems retire the defective data units to avoid further data loss. A defective data unit refers to a data unit of a memory device that is unable to retain data or has experienced data loss. Thus, conventional memory sub-systems are unable to preemptively detect defects in data units.

One particular problem with the current approach of the conventional memory sub-systems is the inability to distinguish between data units marked as defective due to intrinsic factors and those due to extrinsic factors. As such, in conventional memory sub-systems, the memory sub-system controllers often misidentify data units as defective thereby hurting system performance. Misidentification of data units as defective occurs when a read fail not caused by intrinsic factors, is instead caused by an extrinsic factor, and subsequently marked defective anyway. Since read fails caused by such extrinsic factors are transient and the underlying data unit remains functional and is usable in the future, it is not desirable to mark such data units as defective. As such, conventional memory sub-system controllers do not accurately identify potential defects in data units, and can potentially mark otherwise good data units as defective unnecessarily.

Aspects of the present disclosure address the above and other deficiencies by enabling a memory sub-system controller to actively monitor read operations to identify potentially defective data units (e.g., defect candidates) prior to read failure of those data units. Potentially defective data units refer to data units that are experiencing higher levels of wear and as a result are trending towards failure. The memory sub-system controller performs memory access operations (e.g., read operations) on a data unit to retrieve data from the data unit. As a result, the memory sub-system controller determines an error rate of the read operation. The error rate corresponds to an overall amount of errors that occurred during the read operation (i.e., a total number of bit errors in the read data, or a percentage/fraction of the total number of bits in the read data that experienced bit errors). In some embodiments, the memory sub-system controller can use directional failed bit counts (e.g., directional bit errors) defined as number of bits in error in a given direction (e.g., bits written as a logical 0 but read as a logical 1 or bits written as logical 1 but read as logical 0). In some embodiments, the number of logical 0s and logical 1s can be assumed to be balanced in the collection of data units, and the directional error rate can be largely equivalent to the directional failed bit count. The memory sub-system controller can determine whether the data unit is a defect candidate based on whether the error rate of the current read operation satisfies a defect candidate criterion (e.g., meets or exceeds a threshold defect candidate value). Depending on the embodiment, the threshold defect candidate value (e.g., error rate of 12 or directional error rate of 8) can be predefined, or can be tuned in accordance with the behavior of the memory device.

In response to determining that the error rate of the current read operation satisfies defect candidate criterion (e.g., error rate >=12 or directional error rate>=8), the memory sub-system controller performs a defect verification operation on the data unit. Otherwise, the memory sub-system controller determines that the data unit is not a defect candidate. In performing the defect verification operation on the data unit, the memory sub-system controller performs a re-write operation on the data unit (e.g., re-writes the data read from the unit back to the data unit). After the data unit has been re-written, the memory sub-system controller waits a predetermined time period (e.g., 1 ms) and performs another read operation (i.e., a second read) on the re-written data unit. The predetermined time period refers to a period of time between when the write is performed on the data unit and when the second read is performed on the data unit to reduce and/or eliminate read failures due to extrinsic factors.

The memory sub-system controller can determine whether the data unit is defective based on whether the error rate of the re-written data unit satisfies a defect criterion (e.g., meets or exceeds a threshold defect value). Depending on the embodiment, the threshold defect value (e.g., error rate of 6 or directional error rate of 4) can be predefined, or can be tuned in accordance with the defect verification operation. In response to determining that the error rate of the re-written data unit satisfies the defect criterion (e.g., error rate>=6 or directional error rate>=4), the memory sub-system controller marks the data unit as defective. Since the predetermined time period (e.g., 1 ms) between the re-writing of the data unit and the reading of the data unit is often much less than a time period between when the data unit was originally written and read for the first time, in some embodiments the defect candidate criterion can be greater than the defect criterion to account for the reduction in error rate caused by extrinsic factors. If the error rate of the re-written data unit does not satisfy the defect criterion, the memory sub-system controller determines that the data unit is not defective.

Depending on the embodiment, the memory sub-system controller can determine whether to place the data unit on a defect monitoring list in response to determining that the error rate of the re-written data unit satisfies the defect monitoring criterion and that the data unit is not defective (e.g., exceeds a threshold defect monitoring value but less than a threshold defect value). Depending on the embodiment, the threshold defect monitoring value (e.g., error rate of 2 or directional error rate of 1) can be predefined and/or tuned in accordance with the defect verification operation. In some embodiments, the threshold defect monitoring value can be a range (e.g., error rate between 2 and 5 or a directional error rate between 1 and 3). In response to determining that the error rate of the re-written data unit satisfies a defect monitoring criterion, the memory sub-system controller adds the data unit to a defect monitoring list. The defect monitoring list includes a set of data units that satisfy the defect candidate criterion but did not satisfy the defect criterion, and thus can be monitored preemptively to avoid data loss. In some embodiments, periodic defect verification can be performed on the data units on the defect monitoring list.

Advantages of the present disclosure include, but are not limited to, early detection of potentially defective data units to prevent future data loss. By actively monitoring read operations, the memory sub-system controller determines data units that are defect candidates. As a result, the data units that are defect candidates are detected prior to a read fail. The memory sub-system controller, thereafter, performs defect verification operation on the defect candidate. As a result, memory sub-system advantageously distinguishes between data units that are defect candidates due to extrinsic factors and those due to intrinsic factors. The defect verification operation, as a result, avoids over detection of defects in data units due to extrinsic factors. This process improves performance of the memory sub-system and maintains available capacity for storing host data.

Figure 1:
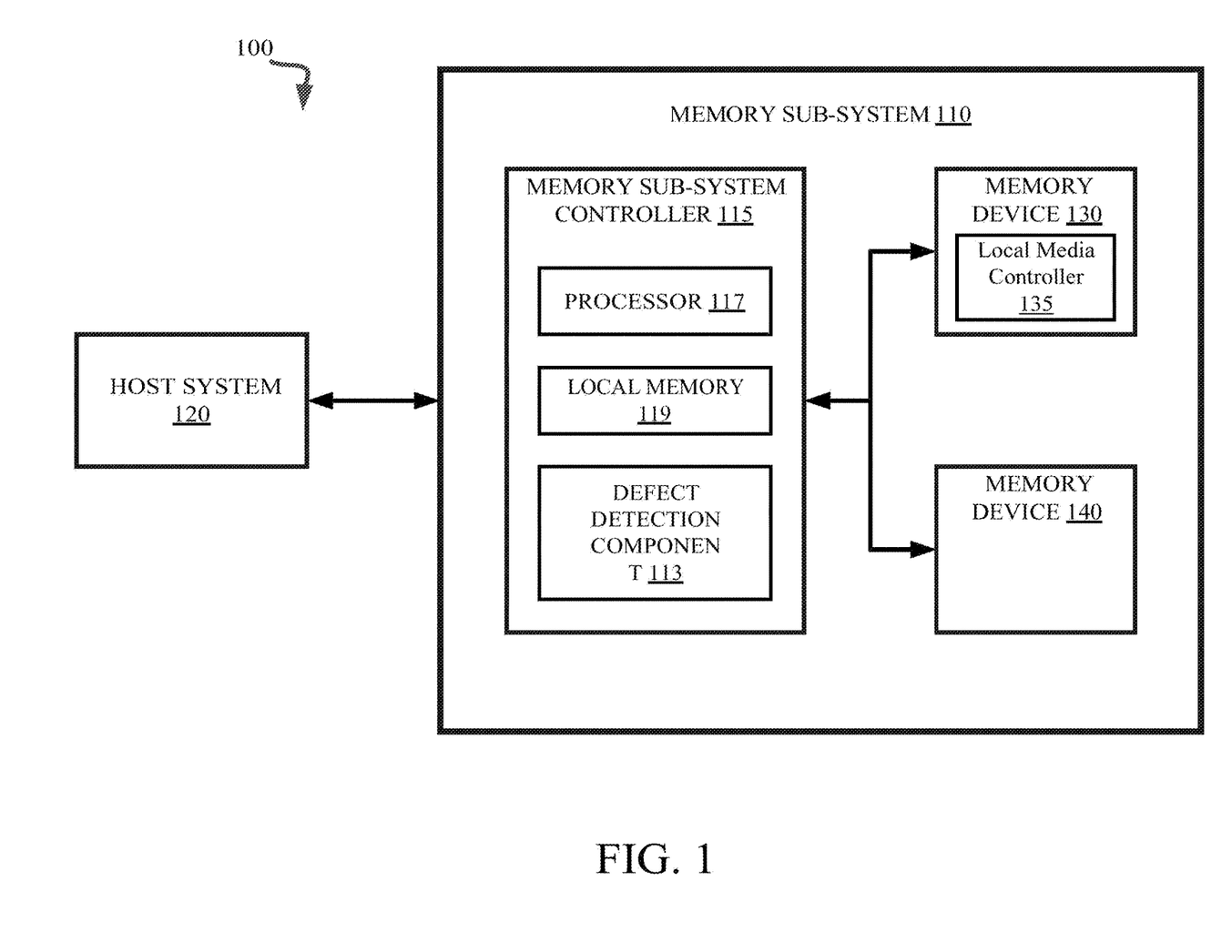
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes defect detection component 113 that actively detects potentially defective data units in memory devices 130, 140 during operation of the memory sub-system 110. In some embodiments, the memory sub-system controller 115 includes at least a portion of the defect detection component 113. For example, the memory sub-system controller 115 can include a processor 117 (processing device) configured to execute instructions stored in local memory 119 for performing the operation described herein. In some embodiments, the defect detection component 113 is part of the host system 110, an application, or an operation system. In other embodiments, local media controller 135 includes at least a portion of defect detection component 113 and is configured to perform the functionality described herein.

The defect detection component 113 can facilitate performing defect detection operation at a data unit (e.g., a block, a page, etc.) at memory device 130, 140. Defect detection component 113 can obtain an error rate associated with a read operation performed on a data unit. Defect detection component 113 can determine whether the data unit is a defect candidate based on the error rate satisfying a defect candidate criterion. In response to determining that the data unit is a defect candidate, defect detection component 113 can perform a defect verification operation on the data unit. Defect detection component 113 can obtain an error rate associated with the defect verification operation performed on the data unit. Defect detection component 113 can determine whether the data unit is defective based on the error rate associated with the defect verification operation satisfying a defect criterion. In response to determining that the data unit is defective, defect detection component 113 can mark the data unit as defective to prevent the data unit from being used to store host data in the future. As described previously, defective data unit refers to a data unit of a memory device that is unable to retain data or experiences data loss. Further details with regards to the operations of the defect detection component 113 are described below.

Figure 2:
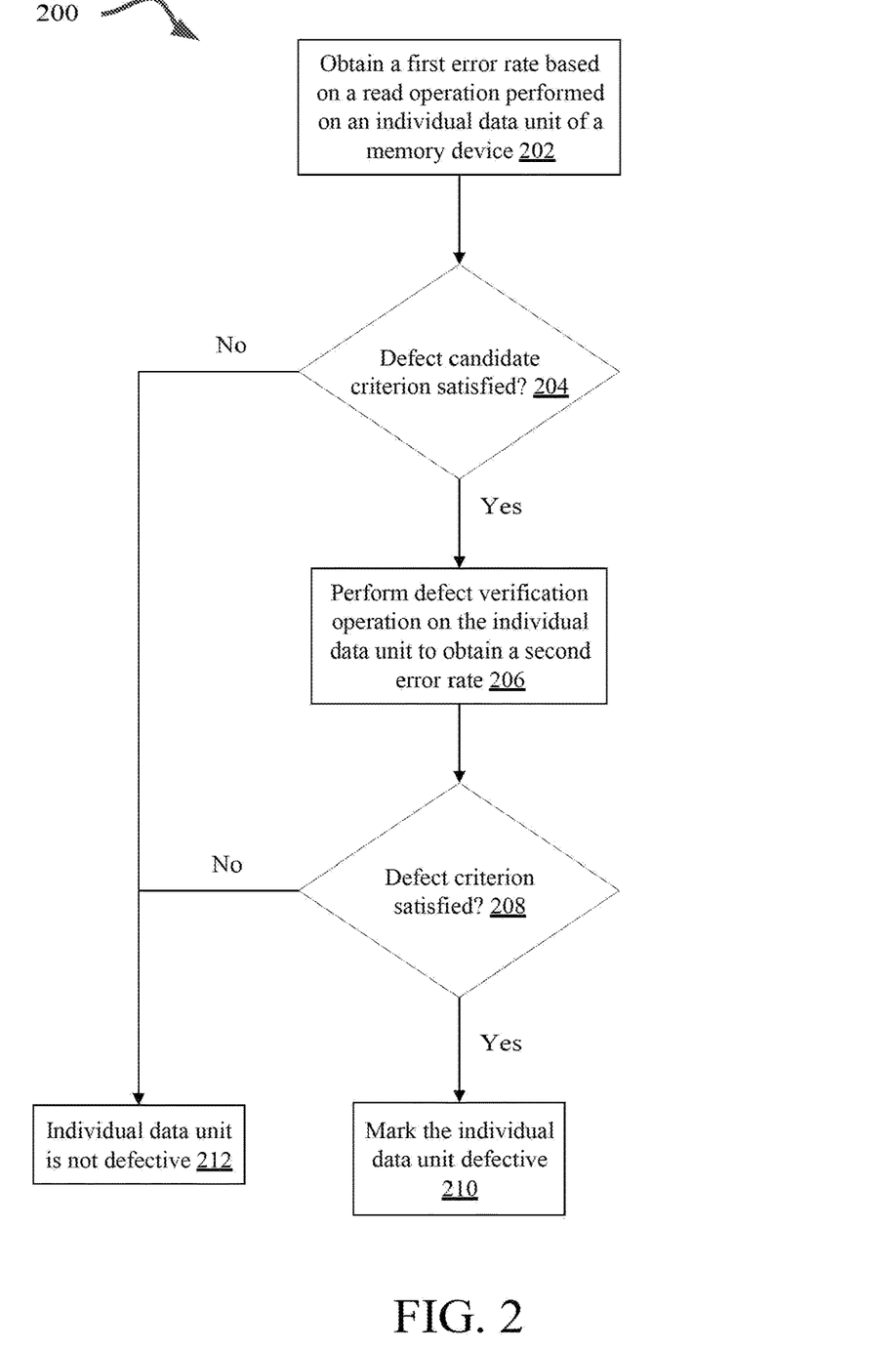
FIG. 2 is a flow diagram of an example method for actively monitoring potential defects in a memory device in accordance with some embodiments of the present disclosure.

FIG. 2 is a flow diagram of an example method 200 to determine whether a data unit of a memory device is defective, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the defect detection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic obtains an error rate based on a first read operation (e.g., first error rate) performed on a data unit of a memory device. As described previously, the error rate corresponds to an overall amount of errors or directional bit errors that occurred during the first read operation.

At operation 204, the processing logic determines whether the defect candidate criterion is satisfied. As described previously, the defect candidate criterion (e.g., first threshold criterion) is satisfied if the first error rate obtained in operation 202 meets or exceeds a defect candidate threshold value (e.g., first threshold value). In response to determining that the defect candidate criterion is satisfied, the processing logic proceeds to operation 206.

At operation 206, the processing logic performs a defect verification operation on the individual data unit to obtain a second error rate. As described previously, in performing the defect verification operation on the individual data unit, the processing logic performs a re-write operation on the individual data unit (e.g., defect candidate). In response to re-writing the individual data unit, the processing logic performs a second read operation on the individual data unit after a predetermined period of time (e.g., 1 ms). As a result, the processing logic returns a second error rate based on the second read operation on the individual data unit (e.g., second error rate).

At operation 208, the processing logic determines whether the defect criterion (e.g., second defect criterion) is satisfied. As described previously, the defect criterion is satisfied if the second error rate obtained in operation 206 meets or exceeds a defect threshold value (e.g., second threshold value). In response to determining that the defect candidate criterion is satisfied, the processing logic proceeds to operation 210.

At operation 210, the processing logic marks the individual data unit as defective. As described previously, in response to marking the individual data unit as defective, the processing logic can remove the individual data unit from further use thereby preventing data loss on the defective data unit.

Figure 3:
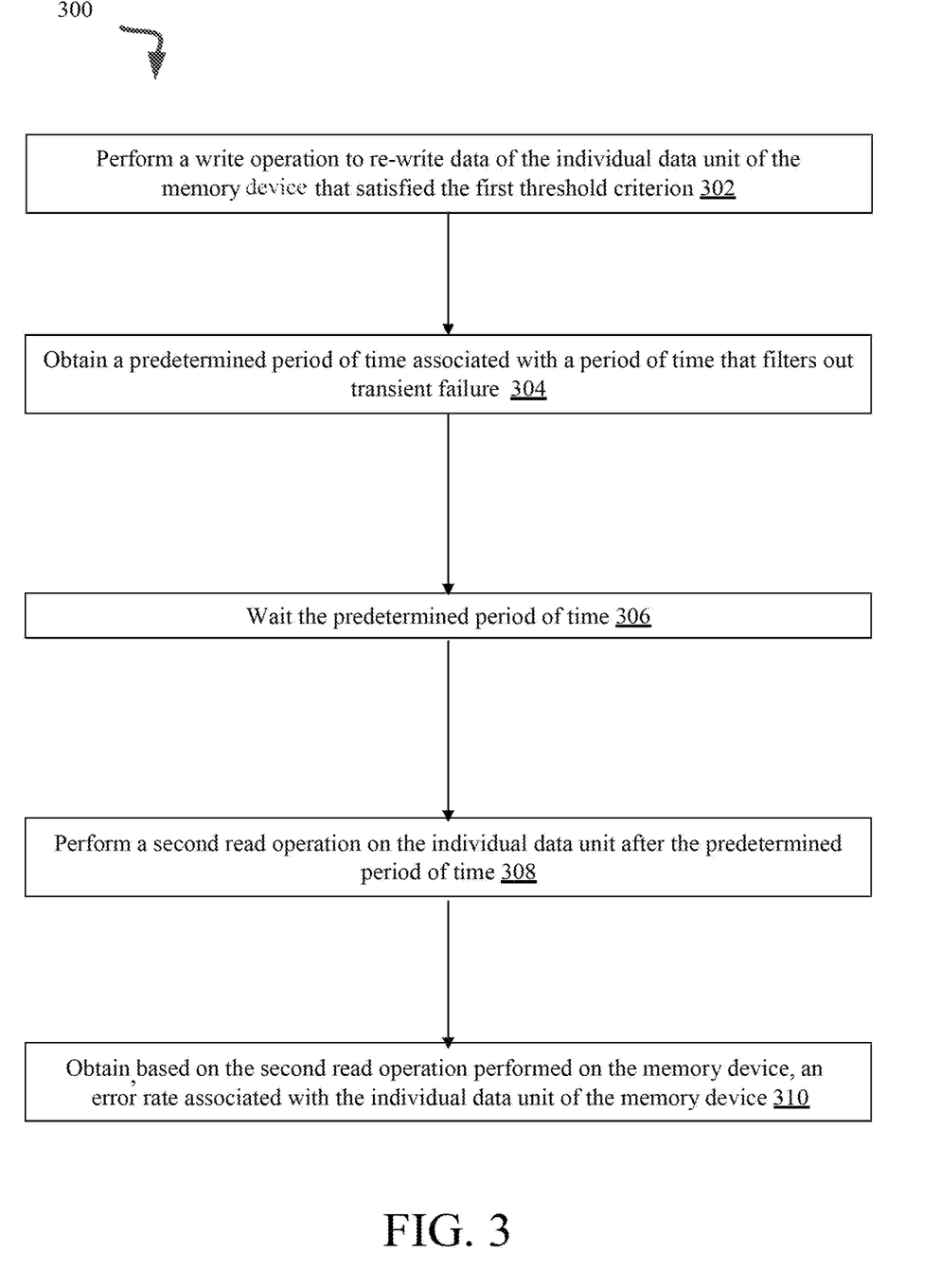
FIG. 3 is a flow diagram of example method for defect verification in a memory device in accordance with some embodiments of the present disclosure.

FIG. 3 is a flow diagram of an example method 300 to perform defect verification operation on the individual unit, in accordance with operation 206 of method 200 or operation 406 of method 400, for example. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 performed by the defect detection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic performs a write operation to re-write data of the individual data unit of the memory device that satisfied the first threshold criterion. Depending on the embodiment, error correcting code operation is performed on the individual data unit that is a defect candidate. As described previously, the individual data unit is considered a defect candidate due to the first error rate associated with the first read operation satisfying the defect candidate criterion. Accordingly, the data of the individual data unit contains errors that need to be corrected prior to re-writing the data onto the individual data unit.

At operation 304, the processing logic obtains a predetermined period of time associated with a period of time that filters out transient failure. Depending on the embodiment, the predetermined period of time can be defined or modified based on extrinsic factors. As described previously, extrinsic factors, such as, time, temperature, read disturbs, and/or write disturbs can cause transient failures during read operations. By obtaining the predetermined period of time, transient errors can be reduced time can be removed as an extrinsic factor. Further, by defining or modifying the predetermined period of time, other extrinsic factors, such as, temperature, read disturbs, and/or write disturbs can be made negligible but reducing the amount of time the extrinsic factors have to cause transient errors during the read operation.

At operation 306, the processing logic waits the predetermined period of time. As described previously, after the write operation, the processing logic waits a predetermined period of time before a read operation is performed on the individual data unit.

At operation 308, the processing logic performs a second read operation on the individual unit after the predetermined period of time.

At operation 310, the processing logic obtains, based on the second read operation performed on the memory device, an error rate associated with the individual data unit of the memory device. As described previously, for example, the error rate corresponds to an overall amount of errors that occurred during the second read operation (i.e., a total number of bit errors in the read data, or a percentage/fraction of the total number of bits in the read data that experienced bit errors).

Figure 4:
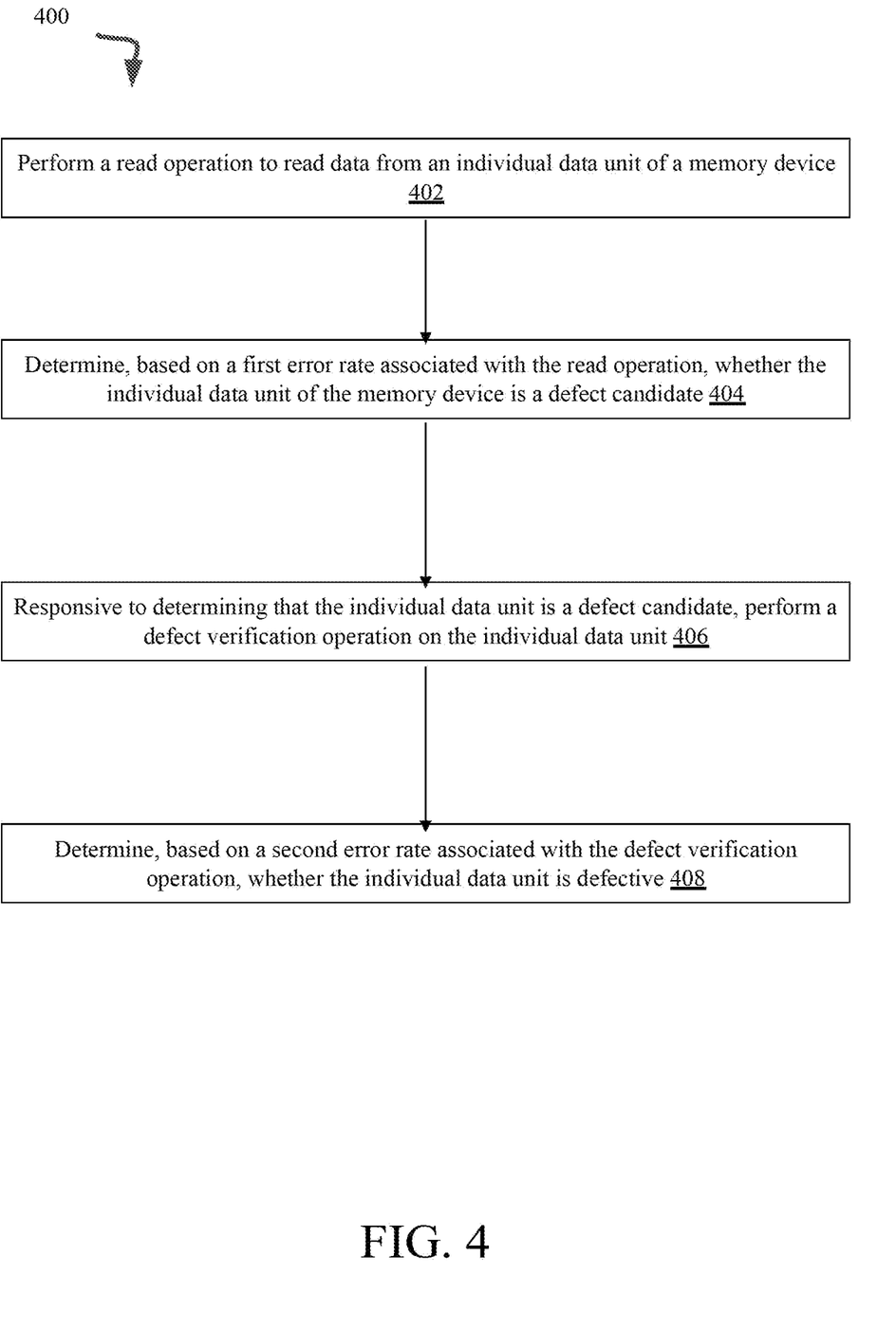
FIG. 4 is a flow diagram of another example method for actively monitoring potential defects in a memory device.

FIG. 4 is a flow diagram of an example method 400 to determine whether a data unit of a memory device is defective, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the defect detection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic performs a read operation to read data from an individual data unit of the memory device.

At operation 404, the processing logic determines, based on a first error rate associated with the read operation, whether the individual data unit of the memory device is a defect candidate. As described previously, the first error rate corresponds to an overall amount of errors or directional bit errors that occurred during the read operation. The individual data unit is a defect candidate if the first error rate associated with the first read operation satisfies the defect candidate criterion. The defect candidate criterion is satisfied if the first error rate is greater than or equal to the defect candidate threshold value. In response to determining that the defect candidate criterion is satisfied, the processing logic proceeds to operation 406.

At operation 406, the processing logic performs defect a verification operation on the individual data unit. As described previously, in view of FIG. 3, the processing logic, in response to performing defect verification operation, performs a re-write operation on the individual data unit that was determined to be defect candidate. In response to re-writing the data of the individual data unit, the processing logic performs a second read operation on the individual data unit after a predetermined period of time (e.g., 1 ms). In response to the second read operation, the processing logic, obtains a second error rate associated with the second read operation on the individual data unit and proceeds to operation 408.

At operation 408, the processing logic determines, based on the second error rate associated with the defect verification operation, whether the individual data unit is defective. As described previously, the second error rate corresponds to an overall amount of errors or directional bit errors that occurred during the read operation. The individual data unit is defective if the second error rate associated with the second read operation satisfies a defect verification criterion associated with a defect. The defect verification criterion is satisfied if the second error rate is greater than or equal to a threshold defect value. In response to determining that the defect verification criterion is not satisfied, the processing logic determines that the individual data unit is not defective. In response to determining that the defect verification criterion is satisfied, the processing logic determines that the individual data unit is defective.

Figure 5:
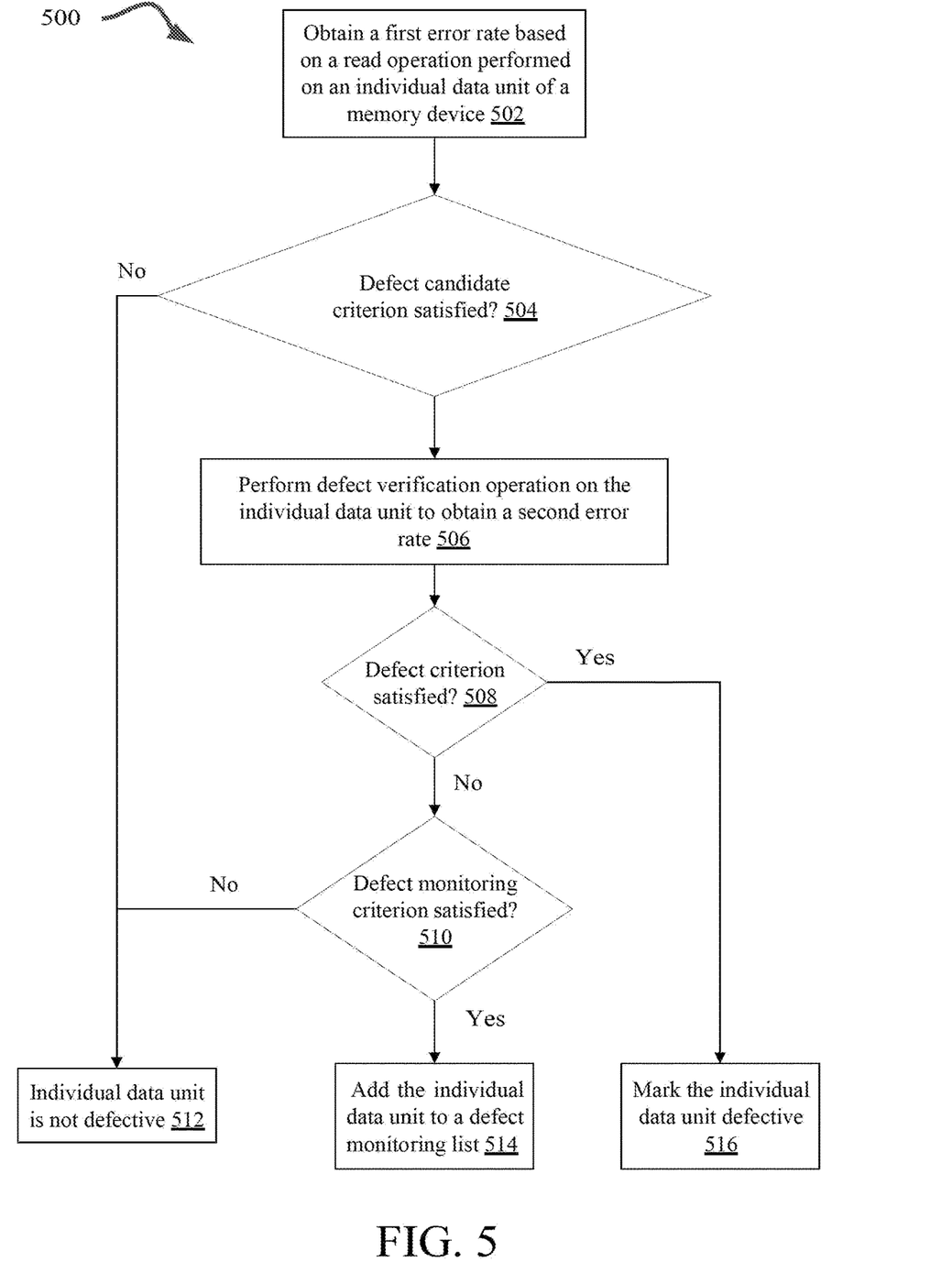
FIG. 5 is a flow diagram of another example method for actively monitoring potential defects in a memory device.

FIG. 5 is a flow diagram of an example method 500 to determine whether a data unit of a memory device is defective or whether to place the individual data unit on a monitoring list, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the defect detection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic obtains an error rate based on a first read operation (e.g., first error rate) performed on a data unit of a memory device. As described previously, the error rate corresponds to an overall amount of errors or directional bit errors that occurred during the first read operation.

At operation 504, the processing logic determines whether defect candidate criterion is satisfied. As described previously, a defect candidate criterion is satisfied if the first error rate obtained in operation 502 meets or exceeds a defect candidate threshold value. In response to determining that the defect candidate criterion is not satisfied, the processing logic proceeds to operation 512. In response to determining that the defect candidate criterion is satisfied, the processing logic proceeds to operation 506.

At operation 506, the processing logic performs a defect verification operation on the individual data unit to obtain a second error rate. As described previously, processing logic can use the error rate associated with the read operation of the defect verification operation as the second error rate.

At operation 508, the processing logic determines whether defect criterion is satisfied. As described previously, a defect criterion is satisfied if the second error rate obtained in operation 506 meets or exceeds a defect threshold value. In response to determining that the defect criterion is not satisfied, the processing logic proceeds to operation 510. In response to determining that the defect candidate criterion is satisfied, the processing logic proceeds to operation 516.

At operation 510, the processing logic determines whether defect monitoring criterion is satisfied. As described previously, a defect monitoring criterion is satisfied if the second error rate obtained in operation 506 is within a defect monitoring threshold value. Depending on the embodiment, the defect monitoring criterion is satisfied if the second error rate falls within a range of a defect monitoring threshold value (e.g., error rate between 2 and 5) which is less than the defect threshold value (e.g., error rate of equal or greater than 6). In response to determining that the defect monitoring criterion is not satisfied, the processing logic proceeds to operation 512. At operation 512, the processing logic determines that the individual data unit is not defective. In response to determining that the defect monitoring candidate criterion is satisfied, the processing logic proceeds to operation 514.

At operation 514, the processing logic adds the individual data unit to a defect monitoring list. Depending on the embodiment, responsive to adding the individual data unit to the defect monitoring list, the processing logic can periodically perform defect verification on the individual data unit to preemptively and actively monitor the individual data unit for defects. In some embodiments, the processing logic, based on the individual data unit being included in the monitoring list, can modify the defect threshold value to be more sensitive to defect detection. The individual data unit can be removed, by the processing logic, from the defect monitoring list based on the second error rate associated with the second read operation being outside the range of the defect monitoring threshold value.

At operation 516, the processing logic marks the individual data unit as defective. As described previously, in response to marking the individual data unit as defective, the processing logic can remove the individual data unit from further use thereby preventing data loss on the defective data unit.

Figure 6:
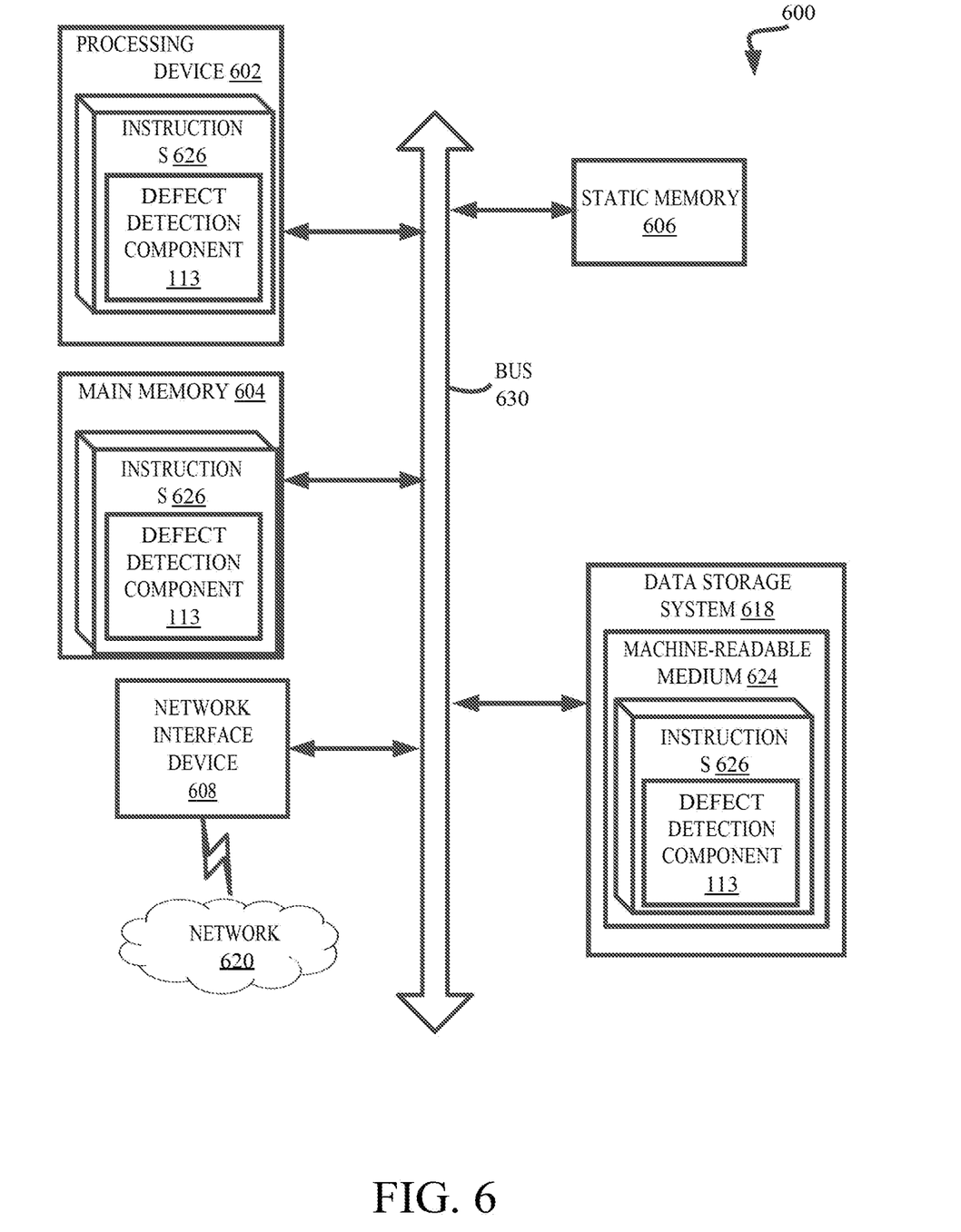
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the defect detection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a defect detection component (e.g., the defect detection component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   obtaining, based on a first read operation performed on the memory device, a first error rate associated with an individual data unit of the memory device;
   determining that the first error rate satisfies a first threshold criterion associated with a defect candidate;
   responsive to determining that the first error rate associated with the individual data unit satisfies the first threshold criterion, performing a defect verification operation on the individual data unit to obtain a second error rate;
   determining that the second error rate satisfies a second threshold criterion associated with a defect; and
   responsive to determining that the second error rate satisfies the second threshold criterion, marking the individual data unit as defective.

2. The system of claim 1, wherein performing the defect verification operation on the individual data unit comprises:
   re-writing data to the individual data unit;
   performing a second read operation on the individual data unit after a predetermined period of time; and
   returning the second error rate.

3. The system of claim 1, wherein the first threshold criterion is satisfied if the first error rate is greater than or equal to a first threshold.

4. The system of claim 3, wherein the second threshold criterion is satisfied if the second error rate is greater than or equal to a second threshold.

5. The system of claim 4, wherein the first threshold is configured to be greater than the second threshold based on a predetermined period of time.

6. The system of claim 5, wherein the predetermined period of time is configured to eliminate extrinsic factors acting on the memory device.

7. The system of claim 1, wherein the first error rate and the second error rate correspond to a number of directional bit errors.

8. The system of claim 1, wherein marking the individual data unit as defective comprises removing the individual data unit from further use.

9. A method comprising:
   obtaining based on a first read operation performed on a memory device, a first error rate associated with an individual data unit of the memory device;
   determining that the first error rate satisfies a first threshold criterion associated with a defect candidate;
   responsive to determining that the first error rate associated with the individual data unit satisfies the first threshold criterion, performing a defect verification operation on the individual data unit to obtain a second error rate;

determining that the second error rate satisfies a second threshold criterion associated with a defect; and responsive to determining that the second error rate satisfies the second threshold criterion, marking the individual data unit as defective.

10. The method of claim 9, wherein performing the defect verification operation on the individual data unit comprises:

re-writing data to the individual data unit;

performing a second read operation on the individual data unit after a predetermined period of time; and returning the second error rate.

11. The method of claim 9, wherein the first threshold criterion is satisfied if the first error rate is greater than or equal to a first threshold.

12. The method of claim 11, wherein the second threshold criterion is satisfied if the second error rate is greater than or equal to a second threshold.

13. The method of claim 12, wherein the first threshold is configured to be greater than the second threshold based on a predetermined period of time.

14. The method of claim 13, wherein the predetermined period of time is configured to eliminate extrinsic factors acting on the memory device.

15. The method of claim 9, wherein the first error rate and the second error rate is a number of directional bit errors.

16. The method of claim 9, wherein marking the individual data unit as defective comprises removing the individual data unit from further use.

17. A non-transitory computer-readable storage medium comprising instructions that, when executed by a processing device, cause the processing device to perform operations comprising:

performing a read operation to read data from an individual data unit of a memory device;

determining, based on a first error rate associated with the read operation, whether the individual data unit of the memory device is a defect candidate;

responsive to determining that the individual data unit is a defect candidate, performing a defect verification operation on the individual data unit; and determining, based on a second error rate associated with the defect verification operation, whether the individual data unit is defective.

18. The non-transitory computer-readable storage medium of claim 17, wherein performing the defect verification operation on the individual data unit comprises:

re-writing the data of the individual data unit;

performing a second read operation on the individual data unit after a predetermined period of time; and returning the second error rate.

19. The non-transitory computer-readable storage medium of claim 17, wherein determining whether the individual data unit of the memory device is a defect candidate comprises:

determining whether the first error rate associated with the read operation satisfies a defect candidate criterion.

20. The non-transitory computer-readable storage medium of claim 18, wherein determining, whether the individual data unit is defective comprises:

determining whether the second error rate associated with the second read operation satisfies a defect criterion.

* * * * *